United States Patent [19]
Fritz et al.

[11] Patent Number: 5,805,061
[45] Date of Patent: Sep. 8, 1998

[54] ELECTRONIC FLASHER UNIT FOR VEHICLE LIGHTING SYSTEM AND METHOD OF MONITORING THE OPERATION THEREOF

[75] Inventors: Andreas Fritz, Brackenheim; Hans-Josef Evens, Wadersloh, both of Germany; Robin D. Ray, Ann Arbor, Mich.

[73] Assignees: Hella KG Hueck & Co., Lippstadt; Temic Telefunken Microelectronic GmbH, Heilbronn, both of Germany

[21] Appl. No.: 826,842

[22] Filed: Apr. 8, 1997

[51] Int. Cl.[6] .................................. B60Q 1/521
[52] U.S. Cl. .................... 340/471; 340/472; 340/478; 340/661; 340/664
[58] Field of Search .................... 340/660, 661, 340/662, 663, 664, 471, 478, 458, 472; 361/86, 88, 90; 307/10.8; 324/173, 207.12

[56] References Cited

U.S. PATENT DOCUMENTS

| | | | |
|---|---|---|---|
| 3,825,307 | 7/1974 | Carr et al. | 340/661 |
| 4,348,655 | 9/1982 | Goertler et al. | 340/661 |
| 4,862,142 | 8/1989 | Knight | 340/661 |
| 4,962,350 | 10/1990 | Fukuda | 340/661 |
| 5,173,832 | 12/1992 | Giorgetta et al. | 340/660 |
| 5,309,142 | 5/1994 | Fritz | 340/471 |
| 5,331,314 | 7/1994 | Koch | 340/661 |
| 5,493,214 | 2/1996 | Good et al. | 324/173 |
| 5,583,731 | 12/1996 | Pergent et al. | 340/664 |
| 5,648,759 | 7/1997 | Miller et al. | 340/660 |

*Primary Examiner*—Brent A. Swarthout
*Assistant Examiner*—Van T. Trieu
*Attorney, Agent, or Firm*—W. F. Fasse; W. G. Fasse

[57] ABSTRACT

A method and an electronic circuit are for monitoring the operation of a circuit including a plurality of intermittently powered parallel load elements, such as the flasher lamps of a vehicle. The total load current is directed through a measuring shunt resistor, and the resulting voltage across the shunt is measured and evaluated. The measured voltage initially arising across the shunt is used as a basis to establish a first voltage level for a load failure control threshold. A second voltage level greater than the first voltage level is established as a short-circuit control threshold. Then, the voltage value arising across the shunt during operation of the circuit is compared to the load failure control threshold and the short-circuit control threshold, and a load failure or a short-circuit is detected dependent upon and responsive to the result of these comparisons. If the measured voltage exceeds the first voltage threshold but not the short-circuit control threshold, then a higher voltage level is established as the load failure control threshold. The method and circuit arrangement are self-evaluating and self-adapting for different current flow conditions, and are suitable for use in a variety of load circuits, particularly a variety of different vehicle flasher light system configurations.

24 Claims, 11 Drawing Sheets

FIG.7A  IC RELAY OUTPUT

X: SHORT-CIRCUIT MONITORING
Y: VOLTAGE MEASUREMENT AT SHUNT
Z: SWITCH POSITION DETECTION

ELECTRONIC FLASHER UNIT FOR VEHICLE LIGHTING SYSTEM AND METHOD OF MONITORING THE OPERATION THEREOF

FIELD OF THE INVENTION

The invention relates to a method for monitoring the operation of an electrical circuit made up of a plurality of parallel-connected electrical load elements, to which a load current is supplied in an intermittent manner, such as the turn signal and emergency or hazard warning flasher lamps of a vehicle lighting system. In the method, the total load current is conducted through a measuring resistor or shunt, and the voltage value arising across this shunt resistor is measured and evaluated. The invention further relates to an electronic circuit for carrying out such a method, including a measuring shunt resistor, at least one controllable switching element for controlling the load current circuit, and a plurality of parallel-connected load elements, such as the flasher or blinker lamps of a vehicle light system.

BACKGROUND INFORMATION

An electrical load current circuit of the above described general type, particularly embodied as an electronic flasher unit for a vehicle lighting system, is disclosed in German Patent Publication DE 4,113,455 C2 and corresponding U.S. Pat. No. 5,309,142 (Fritz) issued May 3, 1994, the entire disclosure of which is incorporated herein by reference. Such known prior art flasher units comprise at least three terminals for activating or driving two, three or four flasher or blinker lamps per flashing direction, for example flasher lamps at the front and the rear of a vehicle, possibly also side-mounted flasher lamps, and a flashing indicator lamp in the vehicle dashboard.

Pertinent legal regulations require that the failure of one or more of the main flasher lamps, i.e. the forward or rear flasher lamps, must be detected and indicated to the driver of the vehicle by either optical or acoustical means. Typically, the failure of a flasher lamp or bulb is almost exclusively indicated acoustically by increasing the flashing frequency, which results in an audibly distinguishable difference in the flasher unit actuation, and also provides a visually distinguishable increased flashing rate of the dashboard indicator bulb.

In order to achieve the required detection of a lamp failure, known electronic flasher units comprise one or more measuring resistors or shunts, and measure the voltage arising across the shunts. If one or more flasher lamps fail, the current flowing through the shunt(s) and the measured voltage across the shunt(s) will drop, whereby the failure of the flasher lamps can be detected. Since all flasher lamps used in Europe exclusively have a power rating of 21 Watts, a single embodiment of a flasher unit having a certain specified shunt resistance is sufficient for all applications. However, in the United States, flasher lamps of various power ratings are used, for example, main flasher lamps having a power rating of 21 Watts or 27 Watts or even higher power ratings.

Moreover, different models of vehicles have different numbers and arrangements of main flasher lamps, for example, model variants in which two main lamps are respectively used in the rear, or in the front and the rear. Due to such variations in vehicle models, or if a failed flasher lamp is replaced with a new lamp having a different power rating, or if a trailer with additional flasher lamps is to be connected, for example, it would be necessary according to the prior art, to provide a plurality of different flasher unit circuits comprising different shunt resistances matched to the respective total flasher lamp power being used in a particular application.

OBJECTS OF THE INVENTION

In view of the above it is the aim of the invention to achieve the following objects singly or in combination:

to provide a method for operating and monitoring the operation of a flasher circuit in such a manner that the number and power of the connected flasher lamps and thus the failure of any lamp can be detected, and the flasher unit can carry out the necessary monitoring function using only a single shunt resistance;

to provide a flasher unit circuit arrangement that can be used for a variety of different vehicle lighting systems, regardless of the number of lamps and the power of the lamps used in the lighting system; and to provide a circuit and method for operating and monitoring a circuit, which are self-adapting to different lighting system situations, for example, the connection of a trailer including additional flasher lamps, without requiring replacement or manual adjustment of the flasher unit.

SUMMARY OF THE INVENTION

The above objects have been achieved in a method for monitoring an electrical load current circuit including a plurality of parallel-connected electrical load elements that are operated in an intermittent manner, wherein the total load current is conducted through a measuring shunt resistor, and wherein the voltage value arising across this shunt is measured and evaluated. More particularly, the method according to the invention includes the following steps. The voltage value initially arising across the measuring shunt due to the load current flowing therethrough is used to establish a first voltage threshold serving as a load failure control threshold. For example, among a plurality of available threshold values, the highest value that is still exceeded by the measured voltage is selected and set as the load failure control threshold. A second voltage threshold, which is higher than the first voltage threshold, is established as a short-circuit control threshold.

The voltage value arising across the shunt during the operation of the circuit is measured and compared to the load failure control threshold and to the short-circuit control threshold, and a load failure or a short-circuit is detected, dependent upon and responsive to the result of the comparison. Particularly, a load failure is detected if the operating voltage value is below the load failure control threshold, and a short-circuit is detected if the operating voltage is above the short-circuit control threshold. If the operating voltage value exceeds the load failure control threshold and does not exceed the short-circuit control threshold, then a higher load failure control threshold is established. This is particularly achieved if the measured voltage exceeds one of the above mentioned plurality of available threshold values that is higher than the previously established load failure control threshold, whereupon the higher exceeded threshold value is established as the new load failure control threshold. In this manner, the control threshold is automatically adapted to the load conditions existing in the circuit.

The invention further provides an electronic circuit for carrying out the method. The electronic circuit according to the invention includes a measuring resistor or shunt and particularly has a total of only one such measuring shunt, at least one controllable switching element for controlling the load current circuit, and an integrated circuit, which are connectable to a plurality of parallel-connected load elements which are especially flasher lamps. The integrated circuit includes at least two comparators or an analog-to-digital converter for comparing the measured voltages with the threshold voltages, an internal control unit for determining which threshold voltages will be used to establish the load failure control threshold and the short-circuit control threshold and for controlling the switching element, and a memory module or unit for storing the established control threshold information.

The method and circuit arrangement according to the invention achieve the following advantages. The flasher unit itself automatically detects and recognizes the respective flasher lamp arrangement, and therefore the flasher unit can universally be used for all flasher light system configurations in all vehicles.

Moreover, for example, a trailer or the like may also be connected to a vehicle equipped with the present circuit arrangement, without requiring the flasher unit to be exchanged with a different flasher unit in view of the additional flasher lamps now being driven in the flasher circuit.

According to a further detail of the invention, it is possible to provide additional voltage thresholds, for example a third voltage threshold and a fourth voltage threshold, in addition to the first and second voltage thresholds. Such an arrangement is particularly advantageous if a trailer or the like using additional flasher lamps is to be connected, or if higher powered flasher lamps are to be used, which would result in a higher load current. In this case, the load failure control threshold can be set at a higher voltage threshold level using the additional third and fourth voltage thresholds. An electronic circuit according to the invention can provide additional comparators or an analog-to-digital converter for utilizing the additional third and fourth voltage thresholds.

As further details of the electronic circuit arrangement, the memory unit can comprise a permanent memory, and the switching elements may be flasher relays or may comprises power MOSFET transistors. As particular features of the method, a voltage measurement for short-circuit detection is preferably carried out at a specified time, for example 50 ms, after the beginning of a lamp lighting phase, and the load current is switched off if a short-circuit has been detected. Then, after a further specified time period, the load current is again switched on, and the evaluation cycle is repeated.

BRIEF DESCRIPTION OF THE DRAWINGS

In order that the invention may be clearly understood, it will now be described, by way of example, with reference to the accompanying drawings, wherein:

FIGS. 7A and 7B are detailed signal timing diagrams corresponding to FIGS. 6A and 6B.

DETAILED DESCRIPTION OF PREFERRED EXAMPLE EMBODIMENTS AND OF THE BEST MODE OF THE INVENTION

Figure 1:
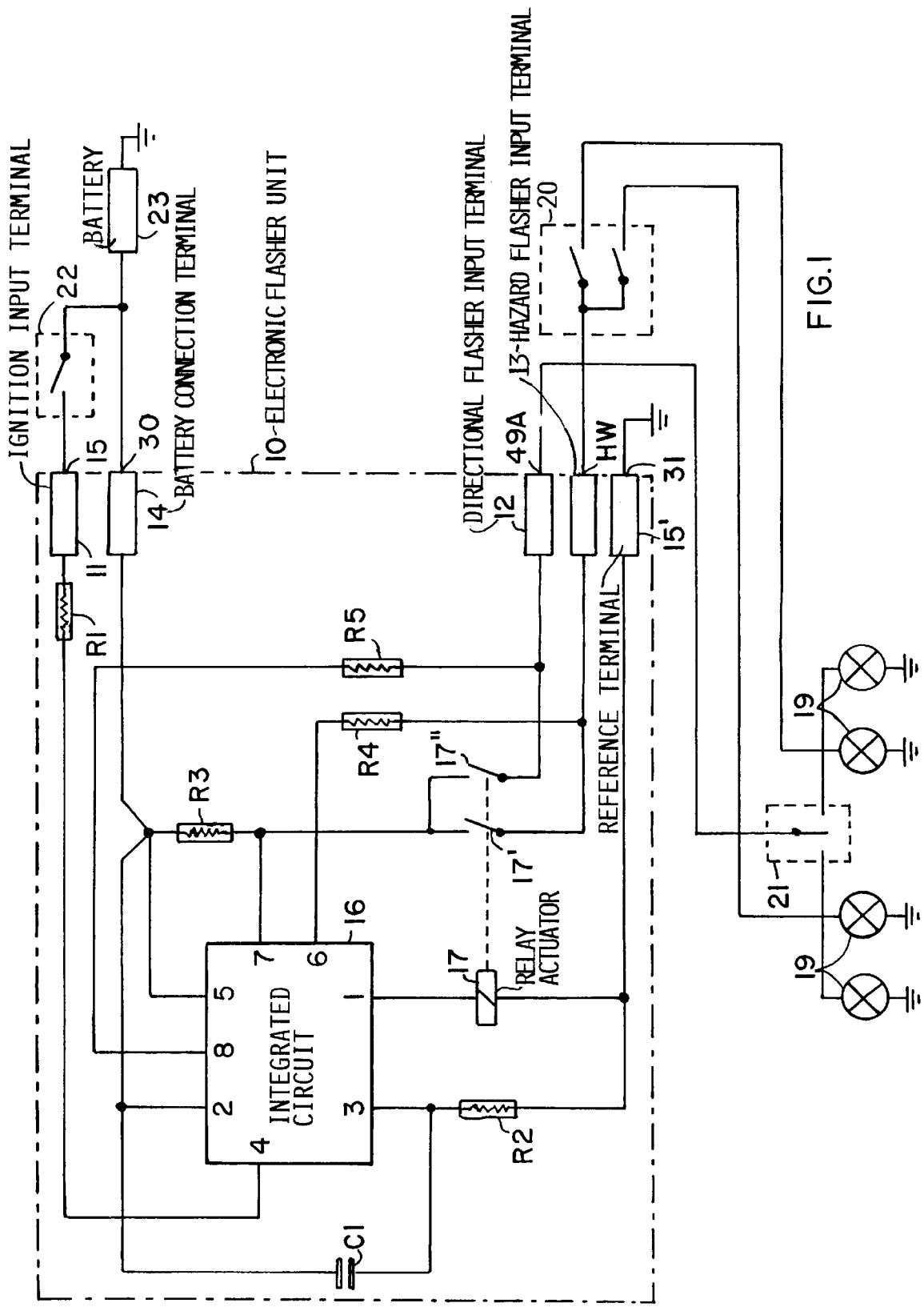
FIG. 1 is a schematic circuit diagram of a first embodiment of a flasher unit including an integrated circuit according to the invention.

FIG. 1 schematically shows a circuit diagram for a first version of an electronic flasher unit 10 according to the invention, including three control inputs or connections, namely the ignition input 11 at a terminal 15 (which may be connected to the vehicle ignition switch 22), a directional flasher switch input 12 at a terminal 49A (which may be connected to the vehicle directional flasher switch 21), and an emergency or hazard warning flasher switch input 13 at a terminal HW (which may be connected to the vehicle emergency flasher switch 20). In addition to these three control inputs/connections, the flasher unit 10 further includes a battery connection 14 at terminal 30 (which may be connected to the vehicle battery 23), and a reference potential connection 15' at terminal 31 (which is grounded in the present example).

Figure 1A:
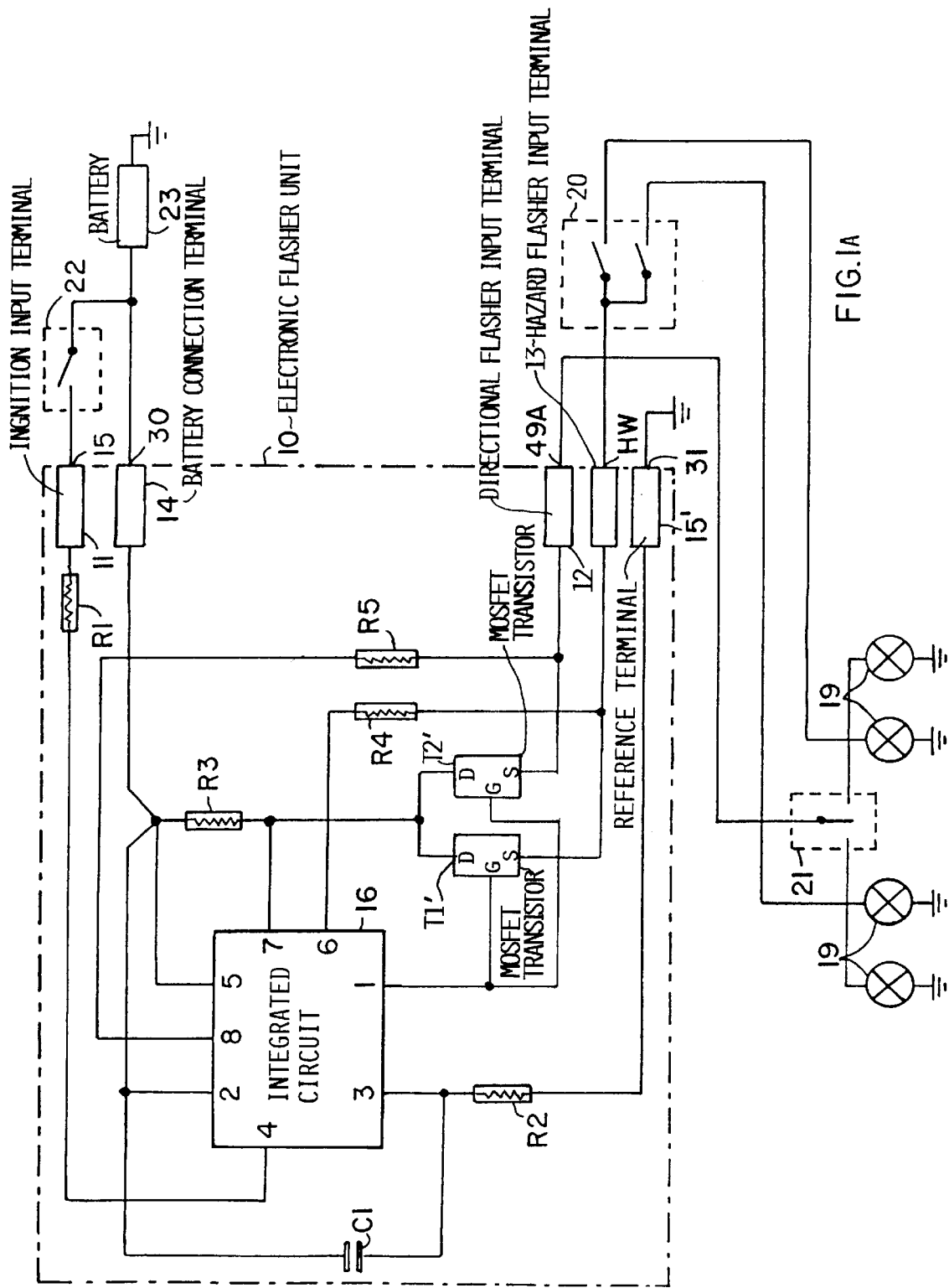
FIG. 1A is a schematic circuit diagram of a variation of the first embodiment, using power transistors as switching elements.

The electronic flasher unit 10 further includes an integrated circuit 16 that has eight external connector pins 1 to 8. Thus, the integrated circuit 16 may conveniently be embodied in an eight pin DIP module or an SO8 module package. The eight connector pins of the integrated circuit 16, include a so-called relay driver output 1 to which a relay 17 or the gate of a power MOSFET transistor may be connected, for example, a connection pin 2 for the power supply voltage $V_S$, a connection pin 3 for the reference potential of the integrated circuit 16, an input 4 for the terminal 15 connected to the ignition switch 22, an emergency flasher input 6, a measuring input 7, an input 5 that is connected to the supply voltage and that provides the reference potential for the measuring input 7, and a directional flasher input 8. While FIG. 1 shows the circuit using the relay 17 with two relay contact switches 17' and 17", FIG. 1A shows the alternative in which the relay device has been replaced by the two MOSFET transistors T1' and T2' respectively having their drain D, gate G and source S connected in the circuit as shown.

A capacitor $C_1$ is arranged between the connector pins 2 and 3 to act as an anchoring capacitor in the event of negative interference voltages acting on the circuit. Ohmic resistors $R_1$, $R_2$, $R_4$, and $R_5$ are arranged in the conductors leading to the connector pins 4, 3, 6 and 8 respectively, in order to protect the integrated circuit 16 from interference impulses and reverse polarity connections. A low value resistor $R_3$, for example having a resistance of 20 mΩ, is used as the measuring resistor or shunt connected between the connector pins 5 and 7, and between the battery connection 14 and the relay contacts 17' and 17" of the relay 17, as described next.

A flasher relay 17, embodying the switching element, is connected to the connector pin 1 of the integrated circuit 16. The two relay contacts 17' and 17" of the flasher relay 17 are connected to and thus activate flasher lamps 19 via an emergency flasher switch 20 or via a directional flasher switch 21. FIG. 1 further shows the ignition switch 22 of the vehicle connected to the ignition terminal 15, and the battery 23, of the vehicle. The exact circuit arrangement and connection of the emergency flasher switch 20, which actually must also be able to activate the flasher lamps 19 even when the ignition switch 22 is switched off, is not shown, but may be carried out in any manner understood by persons of skill in the art through a circuit arrangement internal or external to the flasher unit 10.

Figure 2:
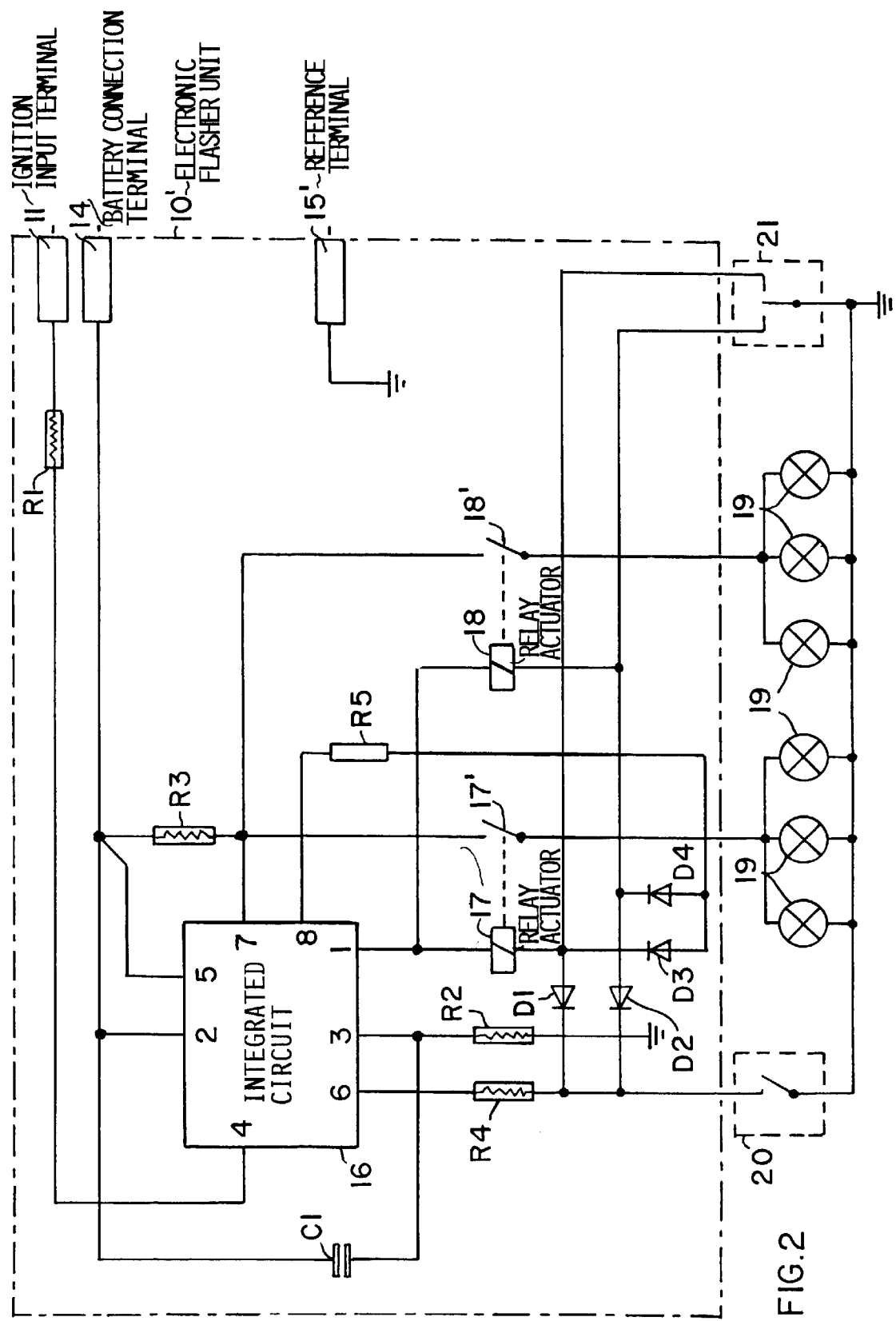
FIG. 2 is a schematic circuit diagram of a second embodiment of a flasher unit, particularly embodied as a two-circuit flasher system, including the integrated circuit of FIG. 1.

FIG. 2 schematically shows a second version of a circuit diagram of a flasher unit 10', which embodies a so-called two-circuit flasher system. In comparison to the circuit of FIG. 1, the present circuit of FIG. 2 has the advantage that the relatively high lamp current does not flow through the switches 20 and 21. Instead, the switches 20 and 21 are respectively arranged in the actuation circuit path for the corresponding relays or power transistors. Therefore the switches may be constructed in a simpler and more economical manner.

Figure 2A:
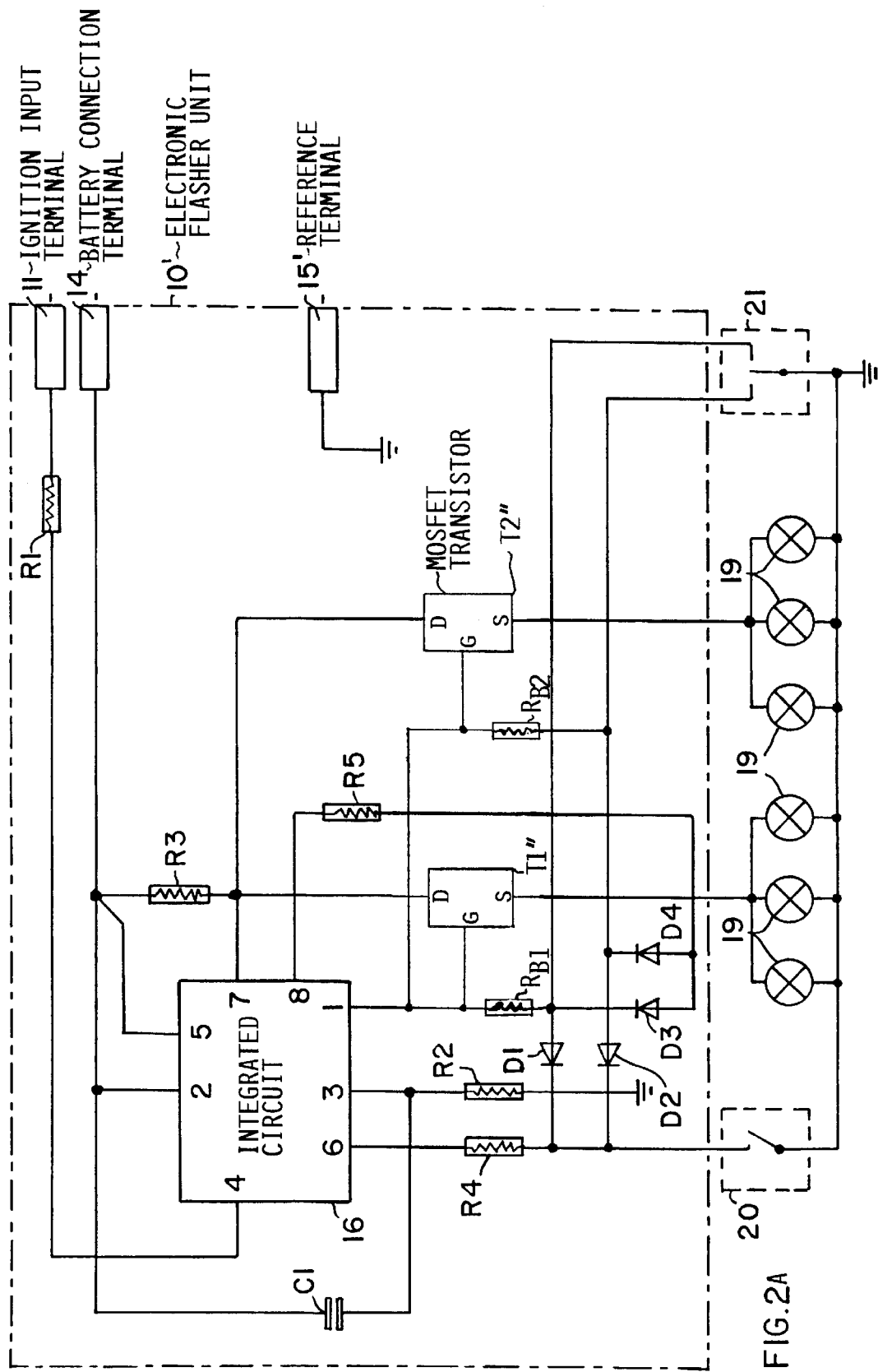
FIG. 2A is a schematic circuit diagram of a variation of the second embodiment, using power transistors as switching elements.

The circuit of FIG. 2 essentially comprises most of the same components as shown and discussed in connection with the circuit diagram of FIG. 1. The respective same components are identified by the same reference numbers, and a redundant description will be omitted here. However, in contrast to the circuit arrangement of FIG. 1, the circuit of FIG. 2 comprises two flasher relays 17 and 18 as the switching element. The two flasher relays 17 and 18 are connected, in parallel with each other, to the connector pin 1 of the integrated circuit 16, and each relay respectively comprises only a single relay contact 17' and 18'. Also, the circuit arrangement of FIG. 2 includes diodes $D_1$, $D_2$, $D_3$, and $D_4$ arranged between circuit connection points as shown in FIG. 2 in order to decouple the various current flow paths from each other during operation in the directional blinking mode or the emergency flashing mode. FIG. 2A shows a variation in which the relays 17 and 18 have been replaced by MOSFET transistors T1" and T2" respectively having their drain D, gate G and source S connected in the circuit as shown.

Even though the two flasher units 10 and 10' according to FIGS. 1 and 2 respectively have different internal circuit arrangements, both circuit configurations can employ the same integrated circuit 16 connected thereto. A preferred internal circuit arrangement of such an integrated circuit 16 is shown in the detail circuit diagram of FIG. 3. The circuit arrangement and operation of the integrated circuit 16 will now be described.

Figure 3:
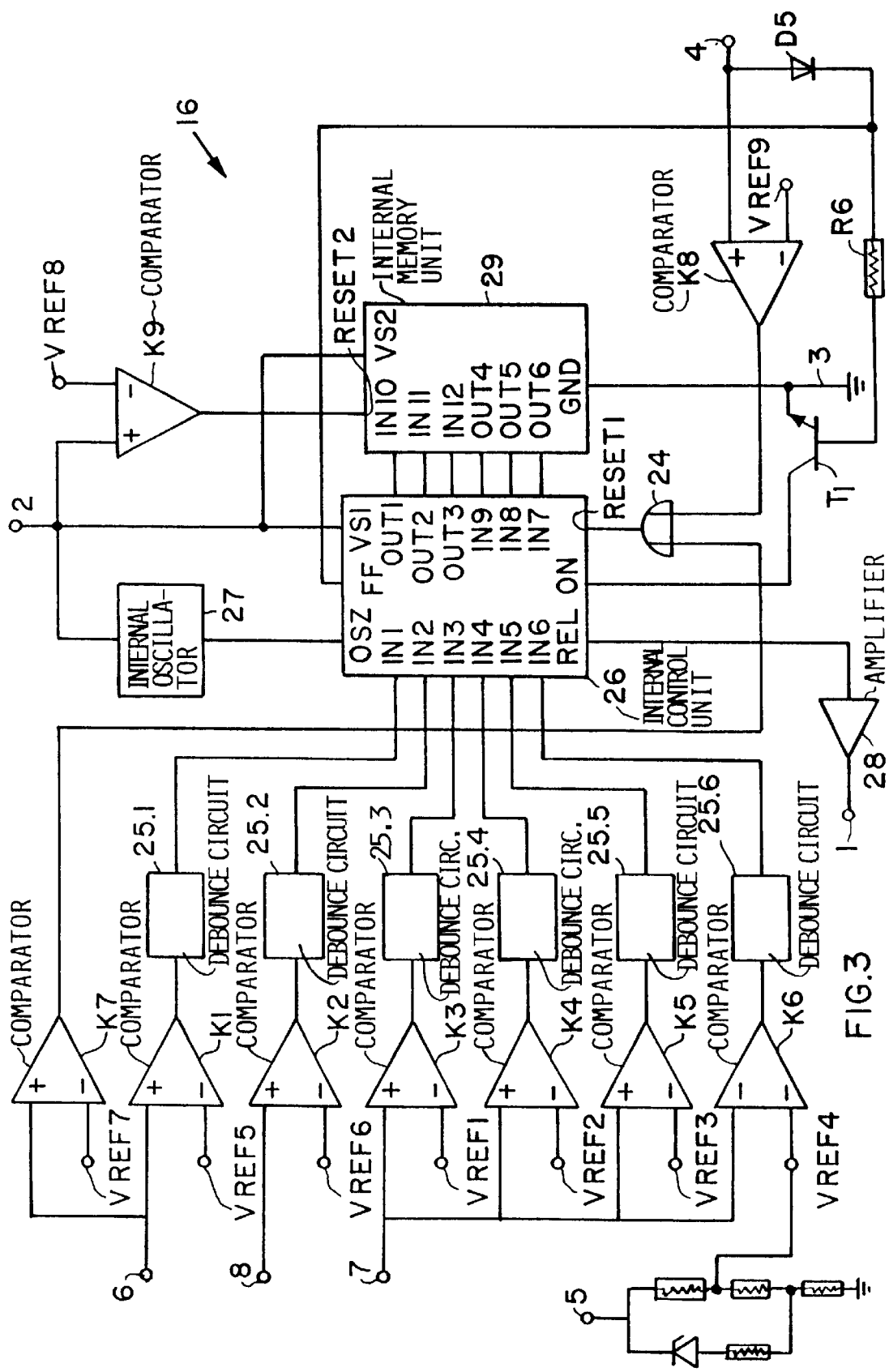
FIG. 3 is a detail circuit diagram of the internal circuit arrangement of the integrated circuit of the flasher units according to FIGS. 1 and 2.

As shown in FIGS. 1 and 2, the connector pin 6 forms the emergency flasher input of the integrated circuit 16. As shown in FIG. 3, a signal applied to the connector pin 6 is respectively applied to the non-inverting input of two comparators $K_1$ and $K_7$ and is respectively compared to respective reference voltages $V_{ref5}$ and $V_{ref7}$ that are applied to the respective inverting inputs of the comparators $K_1$ and $K_7$. If the voltage applied to the connector pin 6 of the IC 16 exceeds the reference voltage $V_{ref7}$, then the comparator $K_7$ provides a signal to one input of an OR-gate 24. Moreover, if the voltage present at the connector pin 6 exceeds the reference voltage $V_{ref5}$, then the comparator $K_1$ provides its output signal first to a debouncing or chatter elimination circuit 25.1 and then from there to one input $IN_1$ of an internal control unit 26.

As shown in FIGS. 1 and 2, the connector pin 8 forms the directional flasher input of the integrated circuit 16. As shown in FIG. 3, the signal provided to the connector pin 8 is applied to the non-inverting input of a comparator $K_2$, where the signal is then compared to a reference voltage $V_{ref6}$ applied to the inverting input of the comparator $K_2$. If the voltage present at the connector pin 8 exceeds the reference voltage $V_{ref6}$, then the comparator $K_2$ outputs a signal to a debouncing or chatter elimination circuit 25.2 and from there to an input $IN_2$ of the internal control unit 26.

As shown in FIGS. 1 and 2, the connector pin 7 is the voltage measurement input of the integrated circuit 16. As shown in FIG. 3, a signal present at the connector pin 7 is respectively applied to the non-inverting inputs of four comparators $K_3$, $K_4$, $K_5$, and $K_6$, where it is respectively compared to reference voltages $V_{ref1}$, $V_{ref2}$, $V_{ref3}$, and $V_{ref4}$ that are respectively applied to the inverting inputs of the four comparators. If the measured voltage applied to the connector pin 7 exceeds any respective one or more of the reference voltages $V_{ref1}$, $V_{ref2}$, $V_{ref3}$, and/or $V_{ref4}$, then the respective corresponding comparator $K_3$, $K_4$, $K_5$, and/or $K_6$ outputs a signal first to a respective debouncing or chatter elimination circuit 25.3, 25.4, 25.5, and/or 25.6 and from there to a respective input $IN_3$, $IN_4$, $IN_5$, and/or $IN_6$ of the internal control unit 26.

In the above described manner, the comparators $K_3$, $K_4$, $K_5$, and $K_6$, form or provide voltage thresholds against which the voltage measured across the shunt resistor $R_3$ can be compared and evaluated. The threshold voltages $V_{ref1}$, $V_{ref2}$, $V_{ref3}$, and $V_{ref4}$, as well as $V_{ref5}$, $V_{ref6}$, $V_{ref7}$, $V_{ref8}$, and $V_{ref9}$ respectively may be formed in any generally known manner, for example by respective tap connections in a voltage divider network connected between the supply voltage at pin 5 and a ground. The lower left corner area of FIG. 3 shows one example of a voltage divider network for providing the reference voltage $V_{ref4}$. The other reference voltages may be provided in a similar manner. The resistance values and arrangement of the resistors in the voltage divider network are selected to achieve the desired voltage value for each reference voltage. The threshold voltages $V_{ref1}$, $V_{ref2}$, $V_{ref3}$, and $V_{ref4}$ should span the typical expected range of measured shunt voltages for the intended application, with particular values logically related to expected measured voltages in the event of a change in the flasher lighting system, such as a bulb failure or connection of a trailer or the like. Table 1 shows example reference voltages for the case of typical 9 volt, 12 volt, and 15 volt applications.

TABLE 1

EXAMPLE REFERENCE VOLTAGES

|  | 9 volt | 12 volt | 15 volt |
| --- | --- | --- | --- |
| $V_{ref1}$ | 51 mV | 57 mV | 63 mV |
| $V_{ref2}$ | 84 mV | 94.5 mV | 105 mV |
| $V_{ref3}$ | 114 mV | 130 mV | 145 mV |
| $V_{ref4}$ | 400 mV | 475 mV | 550 mV |

For example in a 12 volt system using three 21 watt bulbs on each side, e.g. in the right side directional flashing circuit, and using a measuring shunt $R_3$ with a resistance of 20 mΩ, would have an expected current draw of 5.25 amps (ignoring the minimal resistance of the shunt etc.) and thus a voltage of 105 mV across the shunt. This measured value is between the reference voltages $V_{ref2}$ and $V_{ref3}$ as shown in Table 1, so that the threshold $V_{ref2}$ can be assigned as the lamp failure control threshold and the threshold $V_{ref3}$ can be used to detect the addition of a trailer to the flasher circuit, as will be described below.

Figure 3A:
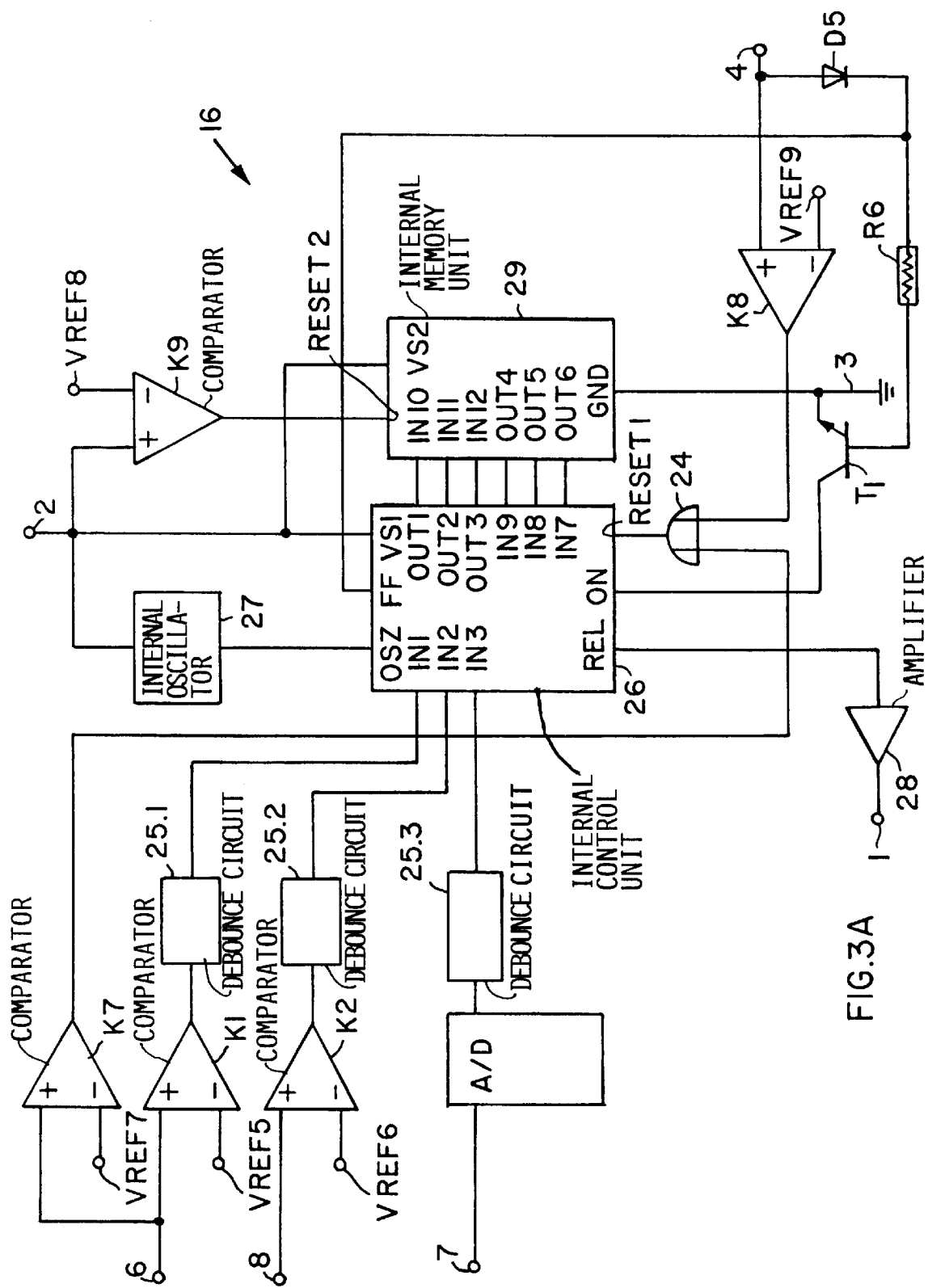
FIG. 3A is a circuit diagram similar to that of FIG. 3, but showing the use of an analog-to-digital converter rather than plural comparators for evaluating the voltage level measured across the shunt.

Instead of the four comparators $K_3$, $K_4$, $K_5$, and $K_6$ used in the present example embodiment, an analog-to-digital converter can alternatively be used for forming the required voltage thresholds and comparing the measured voltage thereto. A person of ordinary skill in the art will readily understand how to replace the comparators with an analog-to-digital converter, as shown in FIG. 3A, for example. By using an analog-to-digital converter connected to the signal input 7, a stepless or infinitely adjustable voltage threshold can be realized for detecting a lamp failure.

The internal control unit 26 further comprises the following connections, in addition to those discussed above. An input OSZ of the control unit 26 is connected to the output of an internal oscillator 27 which, for example, oscillates at a frequency of 100 KHz. As an alternative to the internal oscillator 27, an external oscillator can also be connected to the input OSZ. The input of the oscillator 27 is connected to the connector pin 2 of the integrated circuit 16, which in turn is ultimately connected to the vehicle battery 23 to provide a supply voltage $V_S$. A relay driver output REL of the control unit 26 is connected through an internal amplifier 28 to the connector pin 1 of the integrated circuit 16. An input RESET1 of the control unit 26 is connected with the output of the OR-gate 24. An input ON of the control unit 26 is provided for switching on the internal control unit 26 and is connected to a collector of an internal transistor $T_1$. An input VS1 of the control unit 26 is connected to the connector pin 2 of the integrated circuit 16, to which the supply voltage $V_S$ is applied. A connection FF of the control unit 26 is connected through a resistor $R_6$ to the base of the transistor $T_1$. Three outputs OUT1, OUT2, and OUT3 of the control unit 26 are connected to three inputs IN10, IN11 and IN12 of an internal memory unit 29. Three inputs IN7, IN8, and IN9 of the control unit 26 are respectively connected to outputs OUT4, OUT5, and OUT6 of the internal memory unit 29. The particular functions of various inputs and outputs will be discussed below.

In addition to the above described connections, the internal memory unit 29 further comprises a grounding connector GND that is connected to the ground reference potential, a connector RESET2 for resetting the memory unit 29 in a manner as described below, and a connector VS2 that is connected to the supply voltage $V_S$, i.e. pin 2 of the IC 16.

The integrated circuit 16 according to the schematic circuit diagram of FIG. 3 further comprises a comparator $K_8$, of which the non-inverting input is connected to the connector pin 4 of the IC 16, which in turn is connected to the vehicle ignition 11, 22. The inverting input of the comparator $K_8$ has a reference voltage $V_{ref9}$ applied thereto. The output signal of the comparator $K_8$ is applied to the second input of the OR-gate 24. A diode $D_5$ is arranged with its anode connected to the connector pin 4 and with its cathode connected through a resistor $R_6$ to the base of the transistor $T_1$. A further comparator $K_9$ is arranged with its non-inverting input connected to the battery connector pin 2 of the IC 16, and with a reference voltage $V_{ref8}$ applied to the inverting input of the comparator $K_9$. The output of the comparator $K_9$ is connected to the input RESET2 of the memory unit 29.

The internal memory unit 29 is programmable and comprises a permanent memory for storing information identifying selected voltage threshold values, by reference to which a lamp failure can be detected. In order that the stored values are not lost, i.e. are permanently maintained, the memory unit 29 is constantly connected to the battery 23 of the vehicle. The permanent memory will be reset via the input RESET2, only when the connection to the supply voltage $V_S$, i.e. to the battery, is interrupted and then reconnected. This type of reset is known as a "power on reset" or POR.

The electronic flasher unit 10 or 10' may be operated in a directional flasher or blinking mode, an emergency flasher mode, a lamp failure mode, a trailer connection mode, and a short-circuit mode. Before placing the flasher unit into normal operation for the first time or after any POR reset, it is first programmed, as will be described in the following.

Programming of the Memory Unit 29

The internal memory unit 29 comprises three internal bi-stable flip-flops, which respectively have a low output value at their respective outputs in the preferred state. In each POR reset, these three flip-flops return to the preferred state, whereby the memory is cleared. The new programming operation or initialization of the memory unit 29 that is to be carried out following a POR reset only takes place in the directional blinking mode, i.e. turn signal flashing to the right or to the left, for example during the third lit phase, i.e. the third phase during which the flasher lamps are illuminated. A successful programming or initialization is indicated by setting of a programming flag. There are three situations in which an initialization is not carried out and the programming flag is not set, namely:

(1) in situations of only very short periods of directional blinking to the right or to the left, for example, if only one or two lit phases are carried out;

(2) during emergency flasher operation; and (3) if a short circuit is detected, wherein a very high lamp current is flowing through the measuring shunt $R_3$.

If an initialization is carried out during the third lit phase of the lamps in the ordinary and proper operation of directional blinking to the left or the right, then the following activities will be carried out. After the third lit phase of the lamps, a programming flag is set and will remain constantly activated until the next POR reset that is caused by switching off or disconnecting the supply voltage. The voltage value present at the measuring shunt $R_3$ is compared to the available voltage thresholds $V_{ref1}$, $V_{ref2}$, or $V_{ref3}$ at the comparators $K_3$, $K_4$ and $K_5$, which is carried out in this example by measuring for 5 ms after 130 ms as counted by an internal time counter. The comparator output signals (showing which of the thresholds have been exceeded) are evaluated in the control unit 26, and the highest threshold $V_{ref1}$, $V_{ref2}$, or $V_{ref3}$ that has been exceeded (excluding the case of a short-circuit) is assigned or allocated to be a load failure control threshold, an identification of which is stored in the constantly activated memory of the memory unit 29. For example, one of the inputs IN3, IN4, or IN5 of the controller 26, which respectively receive output signals from comparators $K_3$, $K_4$ and $K_5$, is designated or assigned as the load failure indicator.

More specifically, the four possible voltage level conditions (excepting a short-circuit condition) are that no threshold is exceeded, that only $V_{ref1}$ is exceeded, that $V_{ref1}$ and $V_{ref2}$ are exceeded, or that $V_{ref1}$, $V_{ref2}$ and $V_{ref3}$ are all exceeded by the measured voltage across the shunt. For each of these cases, Table 2 shows the resulting high or low signal value present at the outputs of the comparators $K_3$, $K_4$ and $K_5$, the inputs and outputs IN3, IN4, IN5, OUT1 and OUT2 of the control unit 26, and the inputs IN10 and IN11 of the memory unit 29.

TABLE 2

SIGNAL LEVELS FOR DIFFERENT MEASURED VOLTAGE CONDITIONS

| Threshold Exceeded | K3 | K4 | K5 | IN3 | IN4 | IN5 | OUT1 | OUT2 | IN10 | IN11 |
|---|---|---|---|---|---|---|---|---|---|---|
| none | 0 | 0 | 0 | 0 | 0 | 0 | 0 | 0 | 0 | 0 |
| $V_{ref1}$ | 1 | 0 | 0 | 1 | 0 | 0 | 0 | 1 | 0 | 1 |
| $V_{ref2}$ | 1 | 1 | 0 | 1 | 1 | 0 | 1 | 0 | 1 | 0 |
| $V_{ref3}$ | 1 | 1 | 1 | 1 | 1 | 1 | 1 | 1 | 1 | 1 |

It is possible to store any respective one of the above four possible voltage conditions using two of the flip-flops of the memory unit 29, while the third flip flop is used to store the set or unset value of the programming flag via OUT3 and IN12. The value of the programming flag flip-flop can then be read via OUT6 and the values of the two voltage condition storing flip-flops can be read from OUT4 and OUT5 when the ignition is switched on.

After the above described activities have been carried out, the memory unit 29 has been completely programmed. A new programming sequence will again be carried out only after a POR reset caused by switching off or disconnecting the supply voltage.

If more voltage levels are required than the three internal thresholds $V_{ref1}$, $V_{ref2}$, and $V_{ref3}$ used in this example embodiment, then the circuit must simply include a number of comparators corresponding to the number of desired voltage thresholds, and the memory unit must include additional flip-flops. If, instead of the comparators $K_3$, $K_4$, $K_5$, and $K_6$ used in this example embodiment, an analog-to-digital converter is provided at the signal input 7, then a stepless or infinitely adjustable voltage threshold can be realized for detecting a lamp failure.

Directional Blinking Operating Mode

The directional blinking operating mode is only enabled when the vehicle ignition is switched on, i.e. the ignition switch 22 shown in FIG. 1 is closed. When the ignition switch 22 is switched on, the controller unit 26 interrogates the status, i.e. the stored values, of the memory unit 29. If the programming flag has been set (e.g. high value at OUT6), the values from OUT4 and OUT5 are used to establish which comparator output $K_3$, $K_4$, or $K_5$ is to be activated or used as a load failure control threshold. Then, when the turn signal switch 21 is switched on, the appropriate right-side or left-side lamps 19 will be illuminated in intermittent lit phases. During each lit phase, the voltage value present at the measuring shunt $R_3$ is compared to the reference voltage at the comparator that has been activated or designated as the load failure control threshold.

If the measured voltage value exceeds the respective active threshold voltage but does not exceed the next higher threshold (for example exceeds $V_{ref1}$ but is under $V_{ref2}$ in a case in which $V_{ref1}$ or comparator K3 was initially activated as the load failure control threshold), this indicates that all of the flasher lamps 19 on the respective right-side or left-side of the flasher lighting circuit are in proper working order. In that case, the circuit carries out directional flashing in the ordinary mode with the flasher frequency set to 1.5 Hz in this example. On the other hand, if the measured voltage is below the active load failure control threshold then the circuit will operate in lamp failure mode, and if the measured voltage exceeds thresholds higher than the active load failure control threshold then the circuit will operate in the trailer connection mode, as described below.

Figure 4:
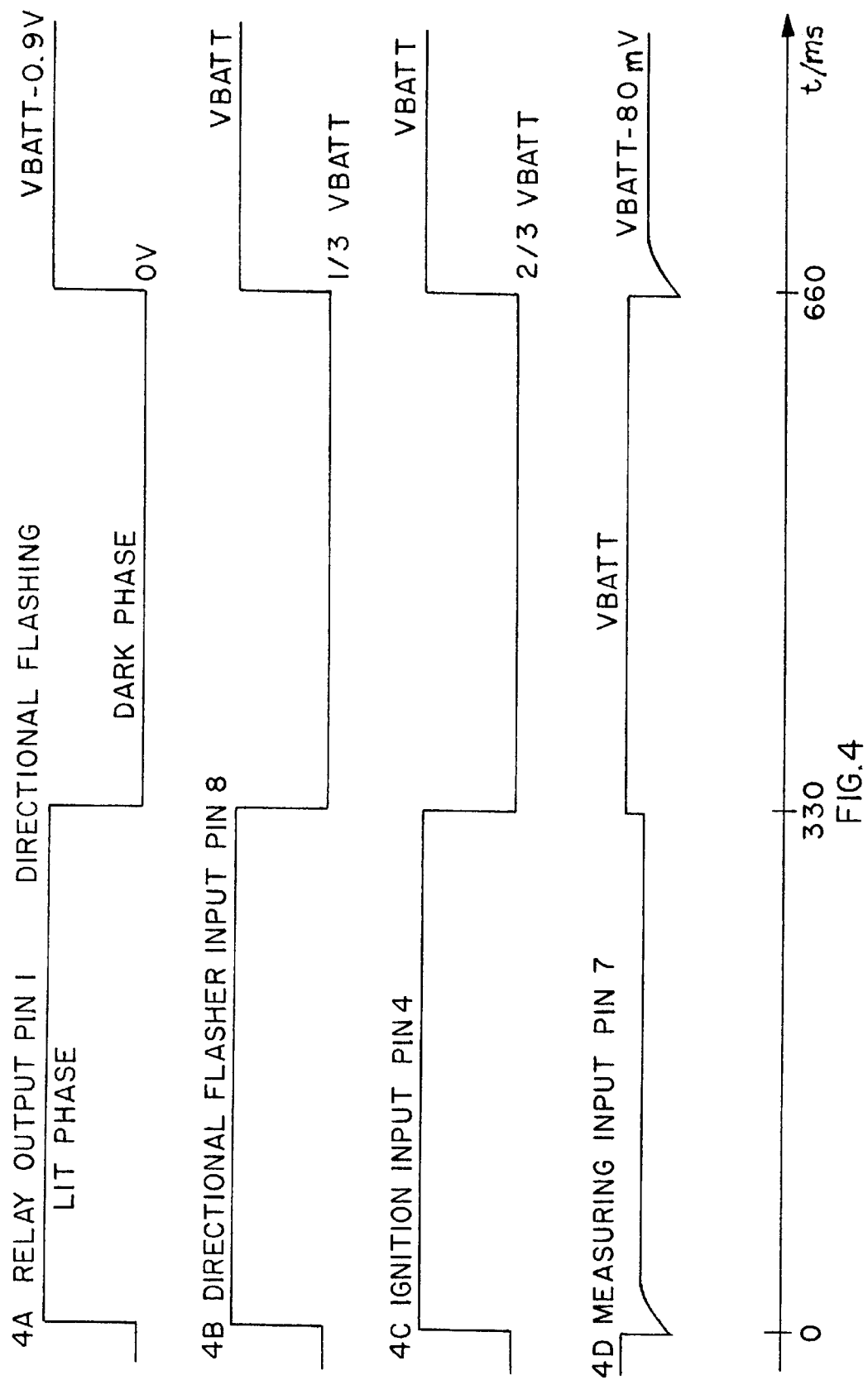
FIG. 4 is a signal timing diagram showing a representative example of the time variation of signals at several pins of the IC of FIG. 3 for operation in a directional flashing mode.

FIG. 4 shows a representative example of the time variation of the signals present at the relay driver output pin 1 (signal 4A), the directional flasher input pin 8 (signal 4B), the ignition input pin 4 (signal 4C), and the measuring input pin 7 (signal 4D), of the IC 16 for operation in the directional flashing or blinking mode. Example high and low voltage levels are indicated for each signal, and the time scale shows a standard example case for a 1.5 Hz flashing frequency of alternating lit and dark phases.

Lamp Failure Operating Mode

If a measured voltage value across the shunt falls below the voltage threshold $V_{ref1}$ for example, i.e. the controller 26 does not receive a signal at its input IN3, this indicates that one or more of the flasher lamps 19 on the respective activated right or left side of the flasher lamp circuit has failed. In order to indicate the lamp failure to the driver of the vehicle, the flashing frequency is doubled to 3 Hz for directional blinking in the direction affected by the lamp failure. If all of the flasher lamps 19 of the other blinking direction are in proper working order, then directional blinking in this other direction will be carried out at the usual frequency of 1.5 Hz. An example of the lamp failure operating mode will be discussed below with reference to the signal timing diagram of FIG. 6B and FIG. 7B.

Short-Circuit Operating Mode

At a specified time, for example 50 ms, after the beginning of each lit phase of the lamps during directional blinking or emergency flashing, the voltage value measured at the measuring shunt $R_3$ is compared to the pre-set short-circuit control threshold. Namely, if a short-circuit is present in the active right or left blinking circuit, whereby the measured voltage value will be greater than the voltage threshold $V_{ref4}$ at the comparator $K_6$, then in response thereto the relay driver output REL is deactivated so as to deactivate the flasher relay(s). In this case, all of the voltage thresholds $V_{ref1}$, $V_{ref2}$, and $V_{ref3}$ are also exceeded, but when the comparator $K_6$ indicates the presence of a short-circuit the other threshold comparators $K_3$, $K_4$, and $K_5$ generally have no function. It is also possible to arrange the circuit to use the outputs of comparators $K_3$, $K_4$, and $K_5$ for malfunction-checking in the event of an indicated short-circuit, namely if the comparator $K_6$ indicates a short circuit but any one of the comparators $K_3$, $K_4$, and $K_5$ does not provide an output, then there is a malfunction.

Although the relay driver output has been deactivated, the internal clock or time count continues to proceed, and after the time period for the next dark phase in which the flasher lamps would have been dark has elapsed, a new lit phase of the lamps is initiated. In this next lit phase, the presence of a short-circuit condition will again be evaluated. As long as a short-circuit is detected by means of the resulting very high lamp current, the short-circuit operating mode must be maintained during directional blinking and emergency flashing, in order to protect the electronics from damage caused by an excessive current flow. The directional blinking or emergency flashing operating modes are only carried out again once a short-circuit is no longer detected in the respective flasher circuit. An example of the short-circuit operation will be discussed below with reference to the signal timing diagrams of FIGS. 6C, 7A, and 7B.

Trailer Connection Operating Mode

If a trailer having additional flasher lamps is connected to the vehicle, then the load current in the flasher circuit will be increased due to the presence of the additional lamps. If the measuring shunt $R_3$ detects a lamp current flowing during directional blinking that is greater than the voltage threshold $V_{ref2}$ but smaller than the short circuit control threshold $V_{ref4}$, i.e. the control unit 26 receives a signal at input IN4 but not at input IN6, in an example in which $V_{ref1}$ was initially established as the load failure control threshold, then the control unit 26 thereby recognizes that an additional load has been added to the flasher circuit, which is generally associated with the connection of a trailer having additional flasher lamps 19. The control unit 26 then adapts the load failure control threshold to the presently flowing increased normal lamp current, i.e. designates the voltage threshold $V_{ref2}$ and input IN4 as the lamp failure threshold indicator for example (assuming in this case that the initially set load failure control threshold was $V_{ref1}$). Thus, a lamp failure can still be detected in the next directional blinking operation by the absence of a signal at IN4 even though a signal may be present at IN3 since the flasher circuit now includes more than the usual number of flasher lamps. The initially programmed values are, however, maintained in the memory unit 29, and the reassignment of a new load failure control threshold is only carried out in the control unit 26. Thus, the initial settings will be reestablished once the ignition is switched off and then switched on again, and then the circuit will reevaluate the possible presence of a trailer.

More specifically, the trailer connection operating mode is maintained only as long as the vehicle ignition remains switched on. When the ignition switch 22 as shown in FIG. 1 has been switched off and then is switched on once again, the trailer connection operating mode will be deactivated because an impulse from the ignition will be applied to connector pin 4 of the IC 16 and will be delivered through the comparator $K_8$ and the OR-gate 24 to the input RESET1 of the control unit 26, whereby the control unit 26 is reset. The trailer connection operating mode will again be initiated when a voltage value, which is measured during directional blinking to the left or to the right with the ignition switched on, is greater than the voltage threshold $V_{ref2}$ in the present example wherein the measured voltage during initialization was between the thresholds $V_{ref1}$ and $V_{ref2}$.

Emergency Flasher Operating Mode

The emergency flasher operating mode is a special case, because this operating mode must always be available and operable, even when the ignition is switched off, a lamp failure exists, or a trailer is connected to the circuit, except in the event of a short-circuit in which case the protective short-circuit operating mode prevails. If the emergency flasher operating mode is selected by switching on the emergency flasher switch 20 shown in FIGS. 1 and 2, before programming of the memory unit 29, then the above described initialization and setting of the programming flag does not take place. Furthermore, no evaluation or detection of possible lamp failure is carried out, and thus the frequency doubling in the case of failure of one of the flasher lamps 19 will also not be carried out. Only in the case of a detected short-circuit will the flasher relays be deactivated in order to protect the circuitry from damage due to the excessive current flow.

Example Timing Diagrams

Figure 5:
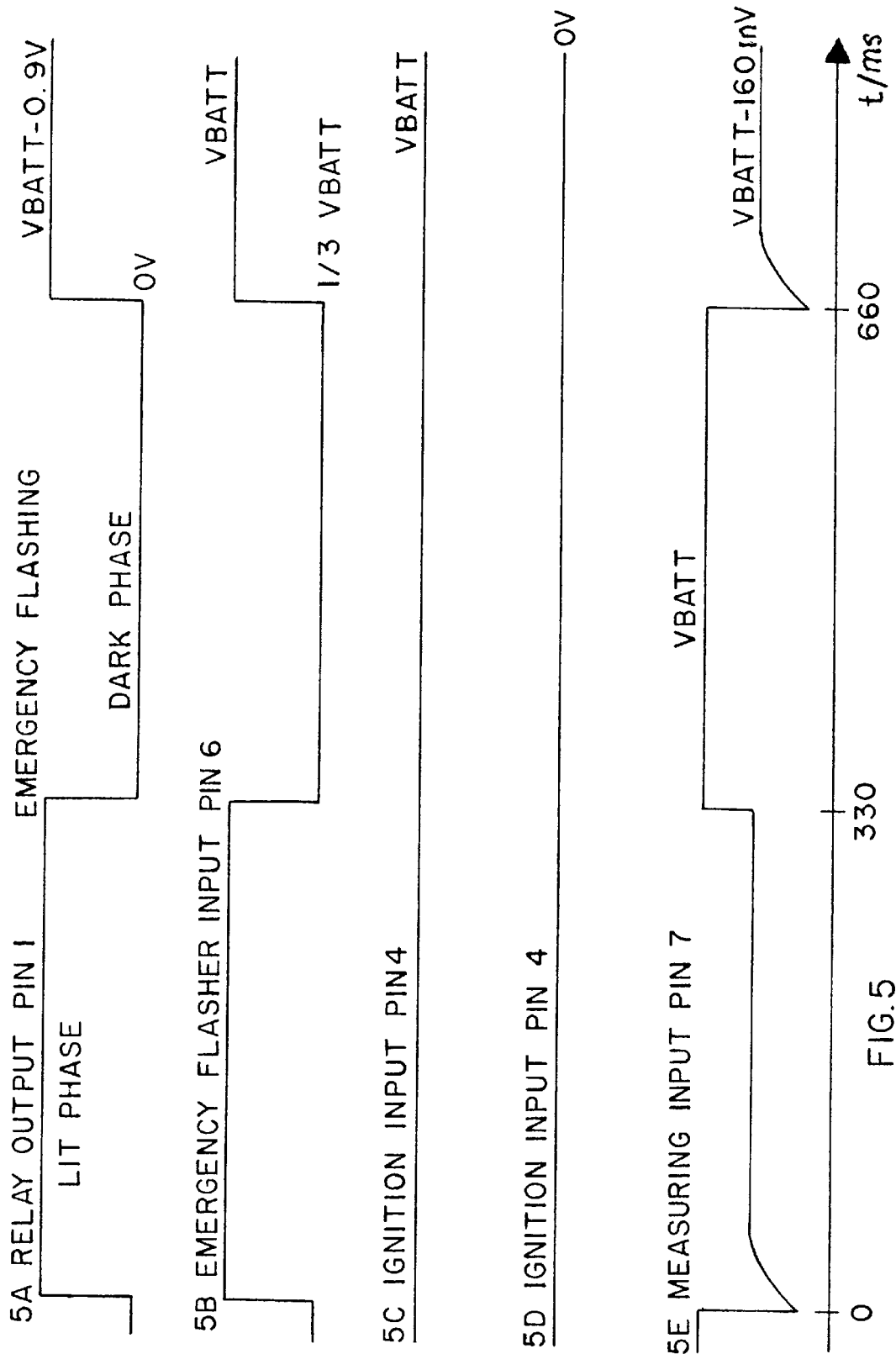
FIG. 5 is a signal timing diagram showing a representative example of the time variation of signals at several pins of the IC of FIG. 3 for operation in an emergency flashing mode.

FIG. 5 shows a representative example of the time variation of the signals present at the relay driver output pin 1 (signal 5A), the emergency flasher input pin 6 (signal 5B), the ignition input pin 4 (signals 5C and 5D), and the measuring input pin 7 (signal 5E), of the IC 16 for operation in the emergency flashing mode. Example high and low voltage levels are indicated for each signal, and the time scale shows a standard example case for a 1.5 Hz flashing frequency of alternating lit and dark phases. Signals 5C and 5D respectively show that the emergency flashing operation mode can be carried out with the ignition switched on and with the ignition switched off.

Figure 6:
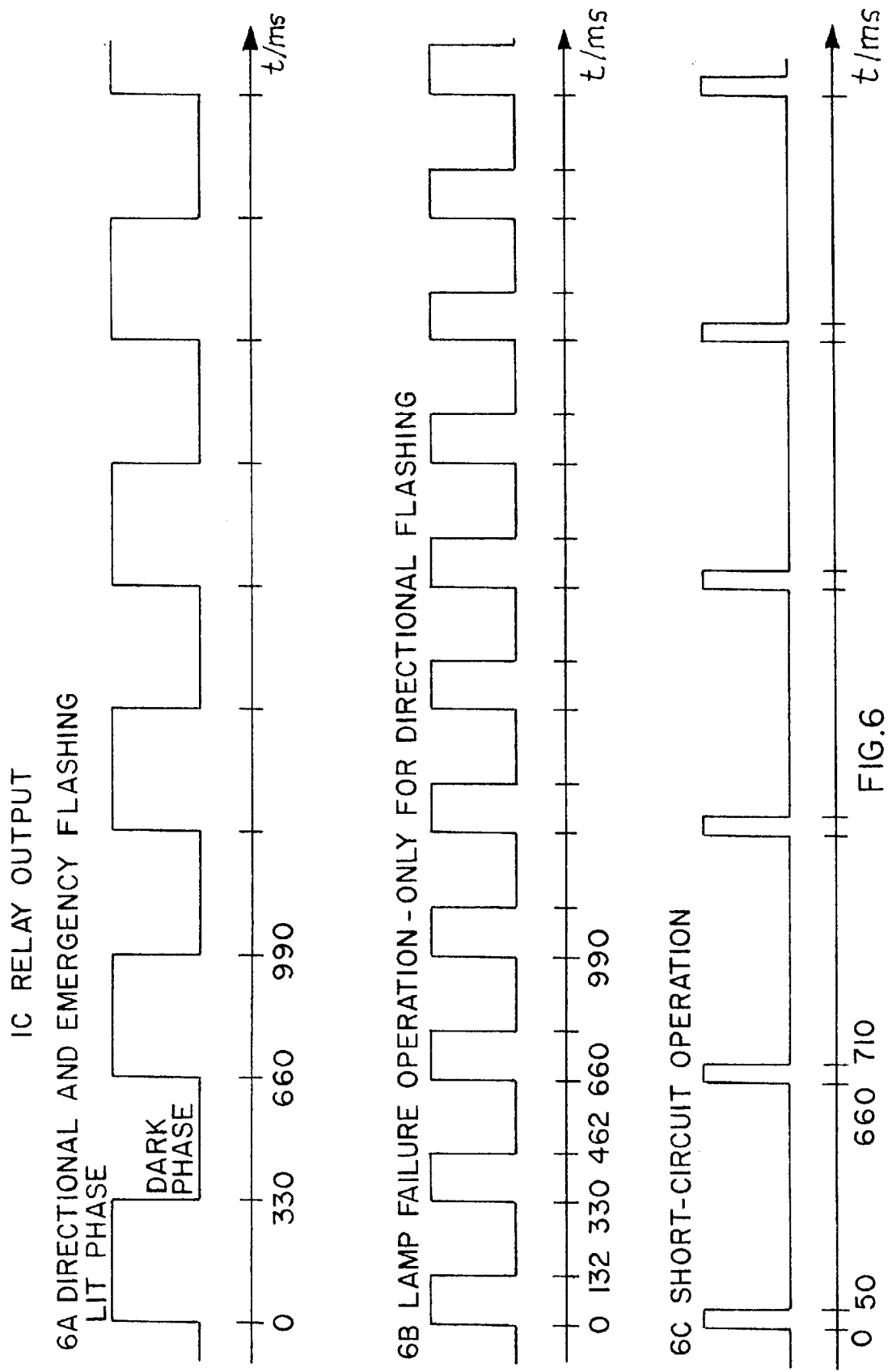
FIGS. 6A, 6B, and 6C are signal timing diagrams showing examples of the time variation of a signal at the relay driving output of the IC in directional or emergency flashing mode, lamp failure mode, and short-circuit mode respectively.

Composite FIG. 6 shows a comparison of signal timing diagrams of the relay driver output signal in the directional and emergency flashing operating modes with a normal flashing frequency of 1.5 Hz (FIG. 6A), the lamp failure operating mode with a doubled flashing frequency of 3 Hz which is only actuatable when directional flashing is selected (FIG. 6B), and the short-circuit operating mode wherein the relay driver output is suppressed or deactuated 50 ms after the beginning of each bulb lighting phase if a short-circuit is detected (FIG. 6c).

Figure 7B:
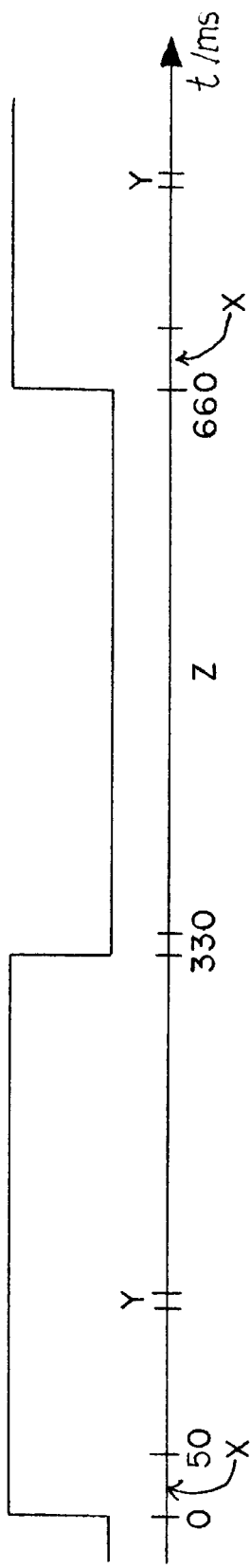
Figure 7B:
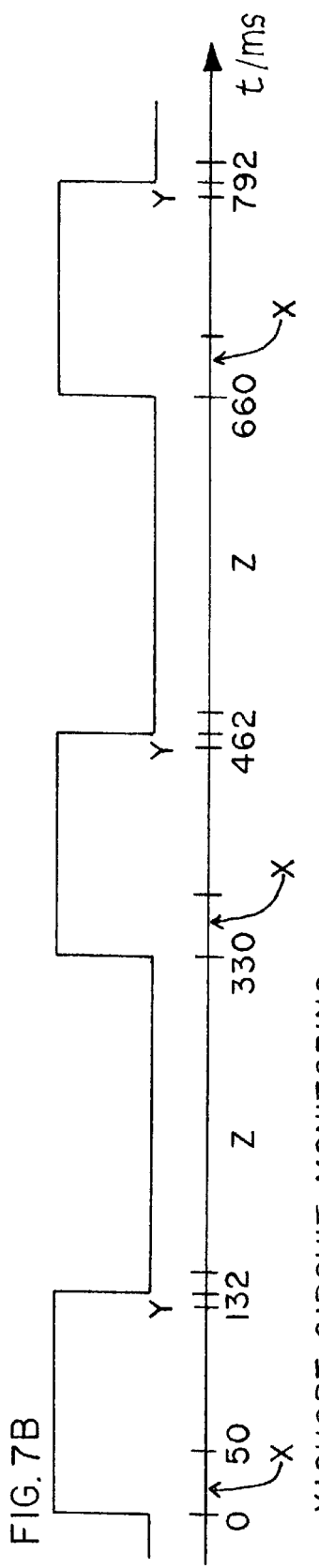

FIGS. 7A and 7B are enlarged detail views of FIGS. 6A and 6B respectively. As shown, the short-circuit detection is carried out at a time X within 50 ms after the beginning of each lit phase. The 50 ms delay for evaluating the short-circuit condition avoids the start-up transient of the measured shunt voltage at the beginning of the lit phase (see e.g. FIGS. 4D and 5E). Also, the timing cycle shown in each of the subviews of FIGS. 6 and 7 begins about 20 ms after closing of the directional or emergency flasher switch, to provide a period of time to avoid contact bounce or chatter.

If a short-circuit is detected during time X, the short-circuit operation proceeds according to FIG. 6C to protect the circuitry from over-current damage. If a short-circuit is not detected, operation proceeds normally according to FIG. 7A, until the operating voltage is measured across the shunt $R_3$ at time Y, for example at about 130 ms. At this point, if the measured voltage is normal (i.e. not below the lamp failure threshold), then the operation continues according to FIG. 7A. On the other hand, if the measured voltage is below the previously established threshold, then the operation proceeds in the lamp failure mode according to FIG. 7B. Finally, during time Z the actuation and position of the directional flasher switch and the emergency flasher switch are evaluated or interrogated to determine whether flashing operation should continue.

Operating Process

Figure 8:
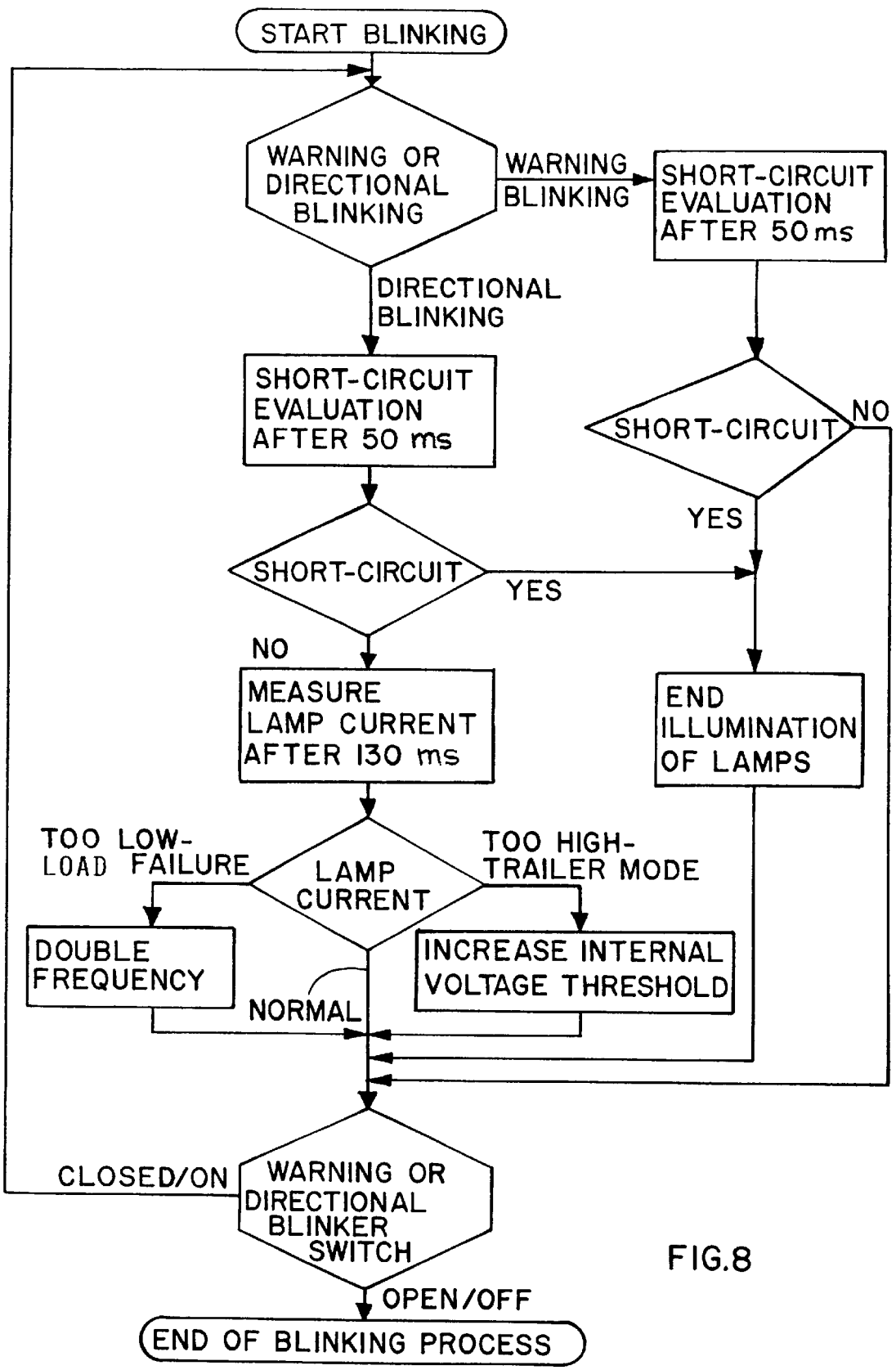
FIG. 8 is a flow diagram showing the procedural flow and the relationship between the measurement processes and the branching-off into various operating modes.

The flow diagram of FIG. 8 illustrates the process flow of the algorithm on which the method according to the invention is based. With the ignition switched on, and a call for blinking or flashing operation to be initiated, the process branches into either the directional blinking mode or the emergency flashing mode depending upon the closing of either the directional blinking switch or the emergency flashing switch. Moreover, the emergency flasher operating mode is also operable with the ignition switched off, as discussed above. Then, a first lit phase of the appropriate flasher lamps is initiated. At a time of 50 ms after the beginning of a lit phase of the lamps, a short-circuit evaluation is carried out by measuring the voltage value arising across the measuring shunt $R_3$ shown in FIGS. 1 and 2, and comparing that measured voltage value to the short-circuit control threshold set in the comparator $K_6$ shown in FIG. 3.

If a short circuit is present in the system, the lit phase of the lamps is immediately terminated in order to protect the electronics from an excessive current flow, and the process branches to an inquiry whether the emergency flasher switch or the directional flasher switch is still actuated.

On the other hand, if a short-circuit is not detected, then the further algorithm flow differs in the two branches. Namely, in the emergency flashing operation branch the algorithm will proceed to the inquiry whether the emergency flasher switch or the directional flasher switch is still actuated, but in the directional blinking operation branch the algorithm will first carry out a measurement and evaluation of the lamp current and will only thereafter proceed to the inquiry whether the emergency flasher switch or the directional flasher switch is still actuated.

In the directional blinking operating mode, the further measurement of the lamp current is carried out 130 ms after the beginning of each lit phase, while no such further current measurement is carried out in the emergency flashing mode. If the measurement determines that the total lamp current flowing through all of the flasher lamps, and correspondingly also flowing through the measuring shunt $R_3$, is less or smaller than the pre-set load failure control threshold, then the lamp failure operating mode is initiated and the blinking frequency is doubled to indicate that a flasher lamp has failed.

On the other hand, if the current measurement determines that the lamp current is high, i.e. the measured voltage exceeds one of the reference voltage thresholds that is higher than the pre-set load failure control threshold but does not exceed the short-circuit threshold, for example because a trailer has been connected, then a respective higher voltage threshold is selected as a new load failure control threshold. The new selected load failure control threshold is greater than the original load failure control threshold, but less than the voltage value measured across the measuring shunt $R_3$. For example, the highest reference voltage that was exceeded by the measured voltage is designated as the new load failure control threshold.

After the load failure control threshold has been increased, or after the frequency has been doubled as a result of detection of a lamp failure, or if the measured voltage at the shunt $R_3$ exceeds the set load failure control threshold but does not exceed the next higher reference voltage threshold (i.e. the voltage is in the normal expected range), then the process continues to the inquiry whether the emergency flasher switch or the directional flasher switch is still actuated. If one of the two switches is closed, then the respective blinking or flashing process will be continued by looping back to the beginning of the algorithm. On the other hand, if both the emergency flasher switch and the directional flasher switch are open, then the blinking or flashing process will be ended.

The method and the electronic circuit according to the invention are especially suitable for use in an electronic flasher unit that can be universally and self-adaptingly used for the control, monitoring, and actuation of a plurality of different configurations of flasher lamps in light systems of vehicles.

Although the invention has been described with reference to specific example embodiments, it will be appreciated that it is intended to cover all modifications and equivalents within the scope of the appended claims. For example, a circuit arrangement according to the invention can use more than four or fewer than four comparators connected to the measured voltage input pin 7, in order to provide more or fewer possible voltage threshold values. In any case, the highest voltage threshold is used as the short-circuit control threshold, and the remaining lower thresholds are available to be selected as the lamp failure threshold for a given particular operating condition.

What is claimed is:

1. A method for monitoring the operation of an electrical load driving circuit including a measuring shunt resistor and a plurality of electrical load elements connected in parallel to one another and in series with said shunt resistor, said method comprising the following steps:
   (a) establishing a load failure control threshold by assigning thereto a first reference voltage;
   (b) establishing a short-circuit control threshold by assigning thereto a second reference voltage that is higher than said first reference voltage;
   (c) flowing a load current through said shunt resistor and through said parallel-connected load elements during successive intermittent current flow phases, whereby respective measured voltages arise across said shunt resistor respectively during said current flow phases;
   (d) in each said current flow phase, comparing said respective measured voltage to said short-circuit control threshold; and
   (e) continuing said flowing of said load current when said comparing in said step (d) determined that said respective measured voltage did not exceed said short-circuit control threshold, and stopping said flowing of said load current when said comparing in said step (d) determined that said respective measured voltage exceeded said short-circuit control threshold;

wherein said step (a) further comprises selecting said first reference voltage to be less than a first one of said respective measured voltages that arises during a first one of said current flow phases.

2. The method of claim 1, further comprising providing a plurality of available reference voltages respectively having different voltage levels less than said second reference voltage, and wherein said selecting of said first reference voltage comprises selecting as said first reference voltage one of said plural available reference voltages that has the highest of said voltage levels that is less than said first one of said measured voltages that arises during a first one of said current flow phases.

3. The method of claim 1, wherein said comparing in said step (d) is carried out at a first time interval after a beginning of a respective one of said intermittent current flow phases.

4. The method of claim 3, wherein said first time interval is about 50 ms.

5. The method of claim 1, further comprising again switching on said flowing of said current and repeating at least said steps (c), (d), and (e) in a next one of said successive intermittent current flow phases, after a shut-off time interval following said stopping of said flowing of said current.

6. A method for monitoring the operation of an electrical load driving circuit including a measuring shunt resistor and a plurality of electrical load elements connected in parallel to one another and in series with said shunt resistor, said method comprising the following steps:
   (a) establishing a load failure control threshold by assigning thereto a first reference voltage;
   (b) establishing a short-circuit control threshold by assigning thereto a second reference voltage that is higher than said first reference voltage;

(c) flowing a load current through said shunt resistor and through said parallel-connected load elements during successive intermittent current flow phases, whereby respective measured voltages arise across said shunt resistor respectively during said current flow phases;

(d) in each said current flow phase, comparing said respective measured voltage to said short-circuit control threshold;

(e) continuing said flowing of said load current when said comparing in said step (d) determined that said respective measured voltage did not exceed said short-circuit control threshold, and stopping said flowing of said load current when said comparing in said step (d) determined that said respective measured voltage exceeded said short-circuit control threshold;

(f) comparing said respective measured voltage to said load failure control threshold, when said comparing in said step (d) determined that said respective measured voltage did not exceed said short-circuit control threshold; and (g) updating said load failure control threshold by assigning thereto an updated reference voltage, when said comparing in said step (f) determined that said respective measured voltage exceeded said load failure control threshold, wherein said updated reference voltage is greater than said first reference voltage and less than said respective measured voltage.

7. The method of claim 6, further comprising providing a plurality of available reference voltages respectively having different voltage levels less than said second reference voltage, and further comprising selecting as said updated reference voltage one of said plural available reference voltages that has the highest of said voltage levels that is less than said respective measured voltage.

8. The method of claim 6, further comprising selecting said first reference voltage from among at least three available discrete reference voltages respectively having different voltage levels less than said second reference voltage.

9. The method of claim 6, wherein said electrical load driving circuit is a flasher lamp circuit of a lighting system of a vehicle, said electrical load elements comprise flasher lamps, and said step (f) is carried out to determine if there exists an open-circuit condition of at least one of said flasher lamps.

10. The method of claim 9, comprising at least two operating modes including a directional blinking mode and an emergency flasher mode that are selectable by an operator of the vehicle, wherein an operation in said directional blinking mode comprises said steps (a), (b), (c), (d), (e) and (f) and an operation in said emergency flasher mode comprises said steps (c), (d), and (e) and does not include said step (f).

11. The method of claim 6, wherein said comparing in said step (d) is carried out at a first time interval after a beginning of a respective one of said intermittent current flow phases.

12. The method of claim 6, further comprising again switching on said flowing of said current and repeating at least said steps (c), (d), and (e) in a next one of said successive intermittent current flow phases, after a shut-off time interval following said stopping of said flowing of said current.

13. A method for monitoring the operation of an electrical load driving circuit including a measuring shunt resistor and a plurality of electrical load elements connected in parallel to one another and in series with said shunt resistor, said method comprising the following steps:

(a) establishing a load failure control threshold by assigning thereto a first reference voltage;

(b) establishing a short-circuit control threshold by assigning thereto a second reference voltage that is higher than said first reference voltage;

(c) flowing a load current through said shunt resistor and through said parallel-connected load elements during successive intermittent current flow phases, whereby respective measured voltages arise across said shunt resistor respectively during said current flow phases;

(d) in each said current flow phase, comparing said respective measured voltage to said short-circuit control threshold;

(e) continuing said flowing of said load current when said comparing in said step (d) determined that said respective measured voltage did not exceed said short-circuit control threshold, and stopping said flowing of said load current when said comparing in said step (d) determined that said respective measured voltage exceeded said short-circuit control threshold;

(f) comparing said respective measured voltage to said load failure control threshold, when said comparing in said step (d) determined that said respective measured voltage did not exceed said short-circuit control threshold; and (g) indicating the existence of a load failure by doubling a frequency of said successive intermittent current flow phases when said comparing in said step (f) determined that said respective measured voltage did not exceed said load failure control threshold.

14. The method of claim 13, wherein said comparing in said step (d) is carried out at a first time interval after a beginning of a respective one of said intermittent current flow phases.

15. The method of claim 13, further comprising again switching on said flowing of said current and repeating at least said steps (c), (d), and (e) in a next one of said successive intermittent current flow phases, after a shut-off time interval following said stopping of said flowing of said current.

16. The method of claim 13, wherein said electrical load driving circuit is a flasher lamp circuit of a lighting system of a vehicle, wherein said method comprises at least two operating modes including a directional blinking mode and an emergency flasher mode that are selectable by an operator of the vehicle, wherein an operation in said directional blinking mode comprises said steps (a), (b), (c), (d), (e) and (f) and an operation in said emergency flasher mode comprises said steps (c), (d), and (e) and does not include said step (f).

17. An electronic circuit for monitoring and intermittently flowing a current through a plurality of parallel electrical load elements, comprising:

at least one controllable switching element arranged and adapted to be connected in series with said parallel electrical load elements for controlledly flowing a load current therethrough during successive intermittent current flow phases;

a measuring shunt resistor connected in series with said switching element and adapted to have said load current flow therethrough whereby respective measured voltages arise across said shunt resistor respectively during said current flow phases;

means for establishing a load failure control threshold by assigning thereto a first reference voltage;

means for establishing a short-circuit control threshold by assigning thereto a second reference voltage that is higher than said first reference voltage;

first means for comparing said respective measured voltage to said short-circuit control threshold in each said current flow phase and for responsively determining whether a short-circuit exists;

second means for comparing said respective measured voltage to said load failure control threshold, and responsively determining whether a load failure of at least one of said load elements exists; and means for updating said load failure control threshold by assigning thereto an updated reference voltage, when said second means for comparing determine that said respective measured voltage exceeded said load failure control threshold, wherein said updated reference voltage is greater than said first reference voltage and less than said respective measured voltage.

18. An electronic circuit for monitoring and intermittently flowing a current through a plurality of parallel electrical loads that are connectable thereto, comprising at least one controllable switching element arranged and adapted to be connected in series with said parallel electrical loads so as to control a flow of a load current to said electrical loads, a measuring shunt resistor connected in series with said switching element, and an integrated circuit, wherein said integrated circuit comprises first and second comparators having respective measuring inputs connected to said shunt resistor and adapted to receive a measured voltage signal therefrom, having respective reference inputs adapted to have respective first and second reference voltages applied thereto, and having respective outputs adapted to provide a first load failure threshold signal and a short-circuit signal respectively, an internal control unit having first and second inputs connected to said respective outputs of said first and second comparators, having a control output connected to and adapted to provide a control signal to said at least one switching element, and having a memory output adapted to provide said first load failure threshold signal, and a memory module having a first input connected to said memory output of said internal control unit and being adapted to store said first load failure signal.

19. The electronic circuit of claim 18, wherein said integrated circuit further comprises two additional comparators having respective measuring inputs connected to said shunt resistor and adapted to receive said measured voltage signal therefrom, respective reference inputs adapted to have respective third and fourth reference voltages applied thereto, and respective outputs respectively adapted to provide respective third and fourth load failure threshold signals, wherein said internal control unit further includes third and fourth inputs respectively connected to said outputs of said two additional comparators, and two additional memory outputs respectively adapted to provide said third and fourth load failure threshold signals, and wherein said memory module further has two additional inputs respectively connected to said two additional memory outputs of said internal control unit.

20. The electronic circuit of claim 15, wherein said memory module comprises a permanent memory.

21. The electronic circuit of claim 15, wherein said at least one switching element comprises at least one flasher relay.

22. The electronic circuit of claim 15, wherein said at least one switching element comprises at least one power MOSFET transistor.

23. The electronic circuit of claim 15, further in combination with a lighting system of a vehicle including an ignition switch, a directional flasher switch, an emergency flasher switch, and said electrical loads, which comprise flasher lamps, wherein said electronic circuit is a flasher module and is connected to said ignition switch, said directional flasher switch, said emergency flasher switch, and said flasher lamps.

24. An electronic circuit for monitoring and intermittently flowing a current through a plurality of parallel electrical loads that are connectable thereto, comprising at least one controllable switching element arranged and adapted to be connected in series with said parallel electrical loads so as to control a flow of a load current to said electrical loads, a measuring shunt resistor connected in series with said switching element, and an integrated circuit, wherein said integrated circuit comprises an analog-to-digital converter having a measuring input connected to said shunt resistor and adapted to receive a measured voltage signal therefrom, and a digital output adapted to provide a digital signal, an internal control unit having an input connected to said digital output of said analog-to-digital converter, a control output connected to and adapted to provide a control signal to said at least one switching element, and a memory output adapted to provide said digital signal, and a memory module having an input connected to said memory output of said internal control unit and being adapted to store said digital signal.

* * * * *

UNITED STATES PATENT AND TRADEMARK OFFICE
CERTIFICATE OF CORRECTION

PATENT NO. : 5,805,061
DATED : Sep. 8, 1998
INVENTOR(S) : Fritz et al.

It is certified that error appears in the above-identified patent and that said Letters Patent is hereby corrected as shown below.

Col. 18,     line 12,     after "claim" replace "15" by --18--;
            line 14,     after "claim" replace "15" by --18--;
            line 16,     after "claim" replace "15" by --18--;
            line 19,     after "claim" replace "15" by --18--;

Signed and Sealed this

First Day of December, 1998

*Attest:*

BRUCE LEHMAN

*Attesting Officer*      *Commissioner of Patents and Trademarks*